United States Patent
Manteufel et al.

(10) Patent No.: US 9,855,724 B1
(45) Date of Patent: Jan. 2, 2018

(54) SPLICE TAPE WITH INTERNAL, INTERLAYER SEPARATION INTERFACE

(71) Applicant: Custom Adhesive Products LLC, Racine, WI (US)

(72) Inventors: Todd Lyal Manteufel, Franksville, WI (US); Stephen Christopher Blackowicz, Hawthorn Woods, IL (US); Jasmina M. Kecinska, Mount Prospect, IL (US)

(73) Assignee: Custom Adhesive Products LLC, Racine, WI (US)

( * ) Notice: Subject to any disclaimer, the term of this patent is extended or adjusted under 35 U.S.C. 154(b) by 0 days.

(21) Appl. No.: 15/430,020

(22) Filed: Feb. 10, 2017

(51) Int. Cl.
| B29C 65/00 | (2006.01) |
| B29C 65/76 | (2006.01) |
| B32B 37/00 | (2006.01) |
| B32B 43/00 | (2006.01) |
| C08J 5/18  | (2006.01) |
| B32B 7/12  | (2006.01) |
| B05D 3/02  | (2006.01) |
| B32B 27/36 | (2006.01) |

(52) U.S. Cl.
CPC .............. *B32B 7/12* (2013.01); *B05D 3/0254* (2013.01); *B32B 27/36* (2013.01); *B32B 2405/00* (2013.01)

(58) Field of Classification Search
USPC ............. 156/289, 307.1, 307.3, 307.5, 307.7
See application file for complete search history.

(56) References Cited

U.S. PATENT DOCUMENTS

| 3,876,454 | A | * | 4/1975 | Snell ...................... A61L 15/42 |
| | | | | 174/84 R |
| 4,382,513 | A | | 5/1983 | Schirmer et al. |
| 4,810,541 | A | | 3/1989 | Newman et al. |
| 4,826,920 | A | | 5/1989 | Dobreski |
| 4,957,679 | A | | 9/1990 | Moore |
| 5,209,418 | A | | 5/1993 | Alexander, III |
| 5,686,126 | A | | 11/1997 | Noel et al. |
| 5,702,555 | A | | 12/1997 | Caudal et al. |
| 5,901,919 | A | | 5/1999 | Wienberg |
| 5,916,651 | A | | 6/1999 | Wienberg et al. |
| 5,919,547 | A | | 7/1999 | Kocher et al. |
| 6,110,552 | A | | 8/2000 | Casey et al. |
| 6,383,450 | B1 | | 5/2002 | Lasson et al. |
| 6,432,241 | B1 | * | 8/2002 | Congard ............. B65H 19/102 |
| | | | | 156/157 |
| 6,488,228 | B2 | | 12/2002 | Davies et al. |
| 6,595,461 | B1 | | 7/2003 | Storbeck et al. |
| 6,627,023 | B1 | | 9/2003 | Gleichenhagen et al. |
| 6,733,879 | B2 | | 5/2004 | Ingerslew et al. |
| 6,756,101 | B2 | | 6/2004 | Manteufel |
| 6,790,378 | B2 | | 9/2004 | Graham et al. |
| 6,792,987 | B2 | | 9/2004 | Monroe |
| 6,811,253 | B1 | | 11/2004 | King et al. |
| 6,817,567 | B2 | | 11/2004 | Storbeck et al. |

(Continued)

*Primary Examiner* — Sing P Chan
(74) *Attorney, Agent, or Firm* — Reinhart Boerner Van Deuren s.c.

(57) ABSTRACT

A splice tape is provided. The splice tape includes two internal support layers bonded at interface between opposing inner surfaces of the internal support layers. The support layers are formed utilizing a process and/or materials that ensure that the two internal support layers separate cleanly and consistently along the interface of the two internal support layers.

8 Claims, 7 Drawing Sheets

(56) References Cited

U.S. PATENT DOCUMENTS

| | | | |
|---|---|---|---|
| 6,899,933 | B2 | 5/2005 | Bean et al. |
| 7,037,397 | B2 | 5/2006 | Bean et al. |
| 8,597,746 | B2 | 12/2013 | Berbert |
| 9,200,183 | B2 | 12/2015 | Yao et al. |
| 2002/0171869 | A1 | 11/2002 | Dibiashi et al. |
| 2003/0010422 | A1 | 1/2003 | Starkey |
| 2003/0056903 | A1* | 3/2003 | Aster .............. B65H 19/283 156/353 |
| 2004/0161564 | A1 | 8/2004 | Truog |
| 2005/0003167 | A1 | 1/2005 | Kitch et al. |
| 2005/0266194 | A1* | 12/2005 | Peters .............. C09J 7/0296 428/40.1 |
| 2006/0141241 | A1 | 6/2006 | Carespodi et al. |
| 2008/0087370 | A1 | 4/2008 | Manteufel |

* cited by examiner

SPLICE TAPE WITH INTERNAL, INTERLAYER SEPARATION INTERFACE

BACKGROUND OF THE INVENTION

The present invention relates generally to splice tapes. The present invention relates specifically to a splice tape with internal support layers having an internal separation interface.

In general, splice tapes are double sided tapes used in roll manufacturing processes, such as roll-based printing processes. A "flying" splice is a common term for referring to a splice that occurs at line speed (i.e., without stopping the process), and a flying splice tape is a tape that allows such splicing at line speed. The flying splice tape is used to attach the trailing end of a roll of material that is being paid off to the leading end of a new roll of material. This splicing arrangement allows the new roll of material to be fed into the manufacturing process as the prior roll of material is used up without interrupting or stopping the process to form the splice.

SUMMARY OF THE INVENTION

One embodiment of the invention relates to a method of forming a splittable splice tape. The method includes providing a first internal support layer including a first major surface and a second major surface. The method includes applying a liquid material onto the second major surface of the first internal support layer, and the liquid material includes a polymer material supported by a carrier liquid. The method includes forming a second internal support layer from the liquid material via removal of the carrier liquid and cross-linking of the polymer material. The second internal support layer includes an inner surface bonded to the second major surface of the first internal support layer. The method includes applying a first layer of adhesive material to the first major surface of the first internal support layer. The method includes applying a second layer of adhesive material to an outer major surface of the second internal support layer.

Another embodiment of the invention relates to a splittable splice tape. The splittable splice tape includes a first internal support layer including a first polymer material, an outer major surface and an inner major surface. The splittable splice tape includes a first adhesive layer directly bonded to the outer major surface of the first internal support layer. The splittable splice tape includes a second internal support layer including a second polymer material, an outer major surface and an inner major surface. The inner major surface of the second internal support layer is directly bonded to the inner major surface of the first internal support layer defining an interface between the first and second internal support layers. The splittable splice tape includes an anti-adhesion material dispersed within the second polymer material of the second internal support layer, at least some of which is located adjacent the interface. The splittable splice tape includes a second adhesive layer directly bonded to the outer major surface of the second internal support layer. The second polymer material is different from the first material and the second polymer material is a cross-linked polymer material. The anti-adhesion material decreases bonding between the first polymer material and the second polymer material such that a bond strength between the first internal support layer and the second internal support layer along the interface is less than a bond strength between second internal support layer and the second adhesive layer such that upon application of a force away from the interface, the splice tape separates in two portions along the interface.

Another embodiment of the invention relates to a splittable splice tape. The splittable splice tape includes a first support layer having an outer major surface and an inner major surface. The splittable splice tape includes a first pressure sensitive adhesive layer coupled to and in contact with the outer major surface of the first support layer. The splittable splice tape includes a second support layer including an outer major surface and an inner major surface, and the inner major surface of the second support layer is in contact with the inner major surface of the first support layer. The splittable splice tape includes a first bond coupling the inner major surface of the first support layer to the inner major surface of the second support layer. The splittable splice tape includes a second pressure sensitive adhesive layer coupled to and in contact with the outer major surface of the second support layer. The splittable splice tape includes a second bond coupling the outer major surface of the second support layer to the second pressure sensitive adhesive layer. The first bond is weaker than the second bond.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide a further understanding and are incorporated in and constitute a part of this specification. The drawings illustrate one or more embodiments and together with the description serve to explain principles and operation of the various embodiments.

DETAILED DESCRIPTION

Referring generally to the figures, a splittable splice tape is shown and described. In general, the splittable splice tape disclosed herein includes two internal support layers each having inner major surfaces that are in contact with and bonded to each other. The level of bonding along this interface is low enough that it forms a splittable interface located between the two internal support layers. Thus, when the tape discussed herein is used for splicing in roll manufacturing processes (e.g., roll-based printing processes), the tape separates along the interface between the two internal support layers which allows a new roll of material to be spliced to the existing roll such that the new role is fed into the manufacturing process without interruption.

The two internal support layers of the tape discussed herein are precisely engineered to provide enough bonding to allow the tape to hold together during handling and application to the rolled material. In addition, the bonding between the two internal support layers is low enough to allow the tape to separate reliably during use. In addition, the materials of the various tape layers also need to be robust enough to traverse the roll manufacturing process without deteriorating or it will otherwise cause problems as the tape traverses the manufacturing system. For example, in specific embodiments, in addition to providing the precise bonding control that allows for predictable separation, the tape material also has various properties, such as high tensile strength, elongation properties and/or heat resistance, that allows the tape to traverse the manufacturing system attached to the roll material without degrading, breaking, melting, etc.

Achieving reliable separation of splice tape is important to roll manufacturing processes, and in the past has typically involved tape structures with many internal layers and complicated structures for providing the various properties needed for reliable separation along with other material properties. For example, in some prior designs, a complicated series of multiple internal layers is used to achieve bond control that provides separation or a complicated internal pattern of adhesive material is used to achieve bond control. In some of these prior designs, the multiple internal layers are formed via lamination of sheets of material. In addition, in some other prior designs, an internal paper layer is used that splits within the layer to provide separation.

In contrast to such designs, the tape discussed herein achieves a precisely controlled interlayer bonding force (which results in controlled separation) at the interface between two internal layers of the tape material. In various embodiments, the two internal layers are polymer materials that are bonded together along their interface via bonding of the layer materials (rather than via an intervening adhesive), and the bond level is controlled via an anti-adhesion material dispersed in one of the polymer materials. Applicant has found that this tape design allows for highly controlled and predictable separation behavior, particularly when compared to splice tapes that utilize intralayer splitting or that use additional intervening layers to control internal tape bonding and separation. In addition, by using separable polymer layers without bonding adhesive, the tape discussed herein passes through manufacturing systems without sticking to machinery or the roll material at unintended times. Similarly, in contrast to designs that separate by creating a tear within a layer of material (typically believed to be a paper material), the design discussed herein separates cleanly along the internal layer interface which Applicant believes provides more predicable separation and prevents debris from the torn layer from interfering with the manufacturing process. In comparison to these prior designs, Applicant believes that Applicant's non-laminate structure at the separation interface and a separation interface formed utilizing a liquid applied and cured material provides a superior level of splice control that provides a significant improvement over prior splice tape designs.

In addition, in some role manufacturing processes, line speeds are very high (e.g., in excess of 3000 feet per minute) and the incoming role is accelerated to the process speed prior to being fed into the process. Thus, given these high speeds and acceleration, the splice tape discussed herein is engineered to have enough bond strength to hold the tape together during the acceleration/speed match process but also to separate at the appropriate time to smoothly allow the new role to be fed into the manufacturing process without splice failure. As discussed in detail below, the interface bonding of the tape of the present application is believed to provide the precision needed to allow for more consistent separation at the desired time while avoiding early splitting during roll acceleration.

Figure 1:
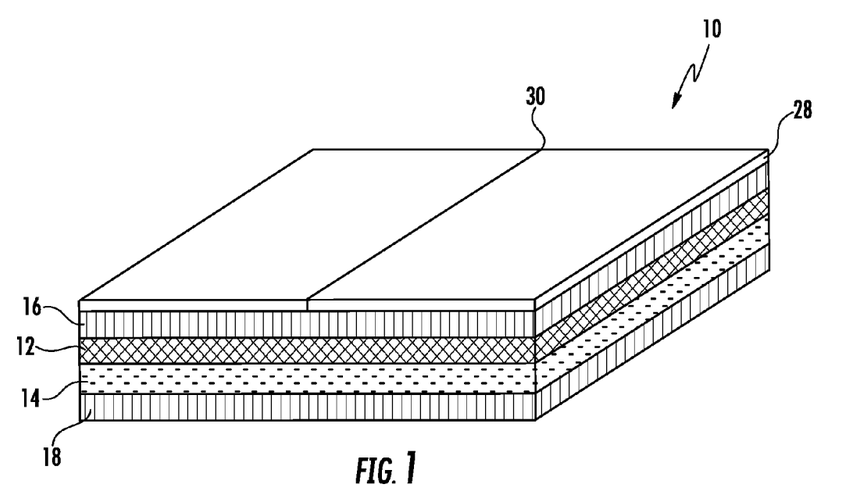
FIG. 1 is a perspective view of a splice tape, according to an exemplary embodiment.
Figure 2:
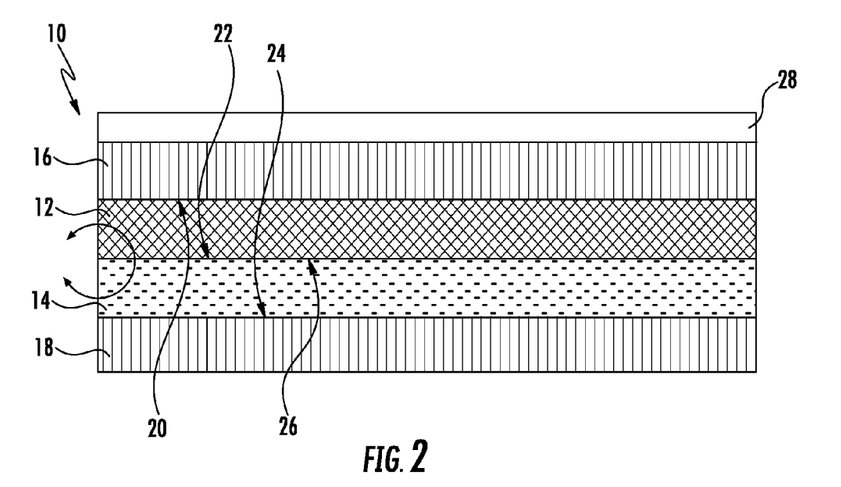
FIG. 2 is a cross-sectional view of the splice tape of FIG. 1, according to an exemplary embodiment.

Referring to FIG. 1 and FIG. 2, a splittable splice tape, such as tape 10, is shown according to an exemplary embodiment. In general, tape 10 includes a first internal support layer, shown as layer 12, and a second internal support layer, shown as layer 14. In specific embodiments, layer 14 is a polymer based lacquer layer formed from a cured, liquid material. Tape 10 includes a first adhesive layer 16 and a second adhesive layer 18.

Layer 12 includes a first major surface, shown as outer major surface 20, and a second major surface, shown as inner major surface 22. Layer 14 includes a first major surface, shown as outer major surface 24, and a second major surface, shown as inner major surface 26. First adhesive layer 16 is bonded directly to outer major surface 20 of layer 12, and second adhesive layer 18 is bonded directly to outer major surface 24 of layer 14.

In general (and as will be described in more detail below), adhesive layers 16 and 18 are adhesive materials configured to adhere tape 10 to both a new incoming roll of material and the trailing end of the current, expiring roll of material to form the splice between the two rolls. In various embodiments, adhesive layers 16 and 18 are formed from pressure sensitive adhesive materials. In specific embodiments, adhesive layers 16 and 18 are formed from any of a variety of adhesive materials, including acrylic, rubber, or silicone based pressure sensitive adhesives. In some embodiments, adhesive layers 16 and 18 are formed from the same adhesive material as each other, and in other embodiments, adhesive layers 16 and 18 are formed from different adhesive materials from each other.

In specific embodiments, adhesive layers 16 and 18 are formed from an adhesive material having high tack, high shear and a temperature resistance of −20 degrees F. to 500 degrees F. In this context, temperature resistance indicates that the adhesive will not degrade and/or the level of adhesive bonding will not decrease when exposed to the noted temperature range. In a specific embodiment, adhesive layers 16 and 18 are formed from an adhesive material that will maintain at least 90%, specifically at least 95% and more specifically at least 99% of its original adhesive bond strength when exposed to temperatures in the range of −20 degrees F. to 500 degrees F. In various embodiments, layers 16 and 18 have an average thickness between 0.25 mils and 8.0 mils, and specifically between 1.0 mil and 5 mils. In some embodiments, the pressure sensitive adhesive materials are liquid or aqueous materials coated to the outer surfaces of support layers 12 and 14, and in such embodiments, the thicknesses discussed herein are dry thicknesses measured after the applied liquid adhesive has dried.

To protect adhesive layers 16 and/or 18, tape 10 includes one or more layer of liner material, shown as release liner 28, coupled to the outer surfaces of layers 16 and/or 18 (release liner 28 is shown in FIG. 1 and FIG. 2 coupled to layer 16). In general, release liner 28 is coupled to and protects adhesive layers 16 and/or 18 during production and prior to use of tape 10 for splicing. In general, release liner 28 is removed by the end user, exposing adhesive layers 16 and/or 18 for attachment of tape 10 to a roll of material for splicing. In one embodiment, release liner 28 is a Kraft paper coated on both sides with a silicone material. In other embodiments, other silicone and non-silicone coated materials may be used for release liner 28.

As shown in FIG. 1, release liner 28 includes a cut or slit 30 dividing release liner 28 into two sections. Slit 30 allows one portion of release liner 28 to be removed to expose a portion of layer 16 while the other section of adhesive layer 16 remains covered. As will be shown and explained in more detail below, this allows the first exposed section of layer 16 to be adhered to the leading edge of the new roll of material while the other portion of layer 16 remains covered, and once the leading edge of the new roll of material is attached to tape 10, the second section of release liner 28 is removed allowing the second portion of layer 16 to be adhered to the trailing edge of an expiring roll of material. In some embodiments, the split release liner 28 works in conjunction with the splittable internal interface of tape 10 by decreasing the chance that the end user inadvertently splits tape 10 apart during removal of liner 28.

Figure 3:
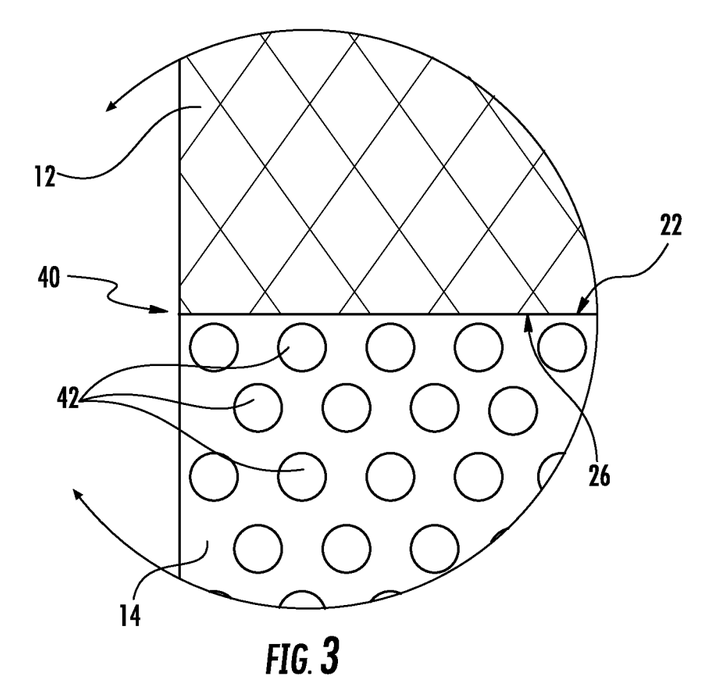
FIG. 3 is a detailed view of an internal, interlayer separation interface of the splice tape of FIG. 1, according to an exemplary embodiment.

Referring to FIG. 2 and FIG. 3, internal support layers 12 and 14 and the splittable interface of tape 10 is shown and described in more detail. In general, layers 12 and 14 are layers of polymer material that support adhesive layers 16 and 18 of tape 10 and that also define the splittable interface 40 of tape 10.

As shown in FIG. 3, inner major surface 22 of layer 12 is directly bonded to inner major surface 26 of layer 14 defining interface 40 between the two distinct inner layers of tape 10. In general, layers 12 and 14 are designed such that the bonding force between layers 12 and 14 is low enough to that tape 10 separates along interface 40 as the new roll of material is pulled into the manufacturing process during splicing but is strong enough to prevent early separation (e.g., during handling and transport before use in splicing and to prevent separation during acceleration of the new roll that occurs immediately before being fed into the manufacturing process). In addition, the bond at interface 40 is configured relative to the other materials and layers to ensure that tape only separates at interface 40 during splicing.

To achieve this specific separation at interface 40, the strength of the bond at interface 40 is less than the strength of the bond between layer 12 and adhesive layer 16 and/or is less than the strength of the bond between layer 14 and adhesive layer 18. This differential bond strength allows tape 10 to separate along interface 40 during use while ensuring that layer 12 stays bonded to layer 16 and that layer 14 stays bonded to layer 18 during splicing. This precise control of bonding properties and separation consistency is provided through the manufacturing process of tape 10 and/or via the properties of the materials of layers 12 and 14 discussed herein.

In various embodiments, layer 12 is formed from a first polymer material, and layer 14 is formed from a second polymer material that is different from the first polymer material. Applicant has found that by selecting the combination of materials for layer 12 and layer 14, the degree of bonding at interface 40 can be controlled (at least when combined with other aspects of the tape and process discussed herein). In various embodiments, the first polymer material of layer 12 is a thermoplastic material, and the second polymer material of layer 14 is a cross-linked polymer material, and in a specific embodiment, the first polymer material of layer 12 is a polyester material, and the second polymer material of layer 14 is a cross-linked polymer polyurethane material. In specific embodiments, the polymer material of layer 14 is a 2K polyurethane material that is cross-linked or activated with an aliphatic isocyanate (specifically polyisocyanate). In particular embodiments, Applicant has found that this material, when cured, crosslinked and hardened, provides the chemical and temperature resistance needed to withstand splice process conditions, while at the same time remaining conformable enough to bend. Further, Applicant found that this material does not soften and adhere to anything (e.g., equipment) during the splice process.

In specific embodiments, layer 12 may be formed from a film, sheet or web of polyester material. In other embodiments, layer 12 may be formed from a film of nylon, polypropylene, polyethylene, vinyl, unplasticized polyvinyl chloride, polyimide, other polyolefins or various blended film materials. Applicant has found that thermoplastics generally, and polyesters, specifically have good strength, elongation properties and heat resistance which allows layer 12 to be passed through a variety of roll-based manufacturing processes without degradation. In one embodiment, the material of layer 12 (and specifically a polyester material) has a tensile strength greater than 20 lbs/in, elongation of 80% and/or a melting temperature greater than 230 degrees C. In another embodiment, the material of layer 12 (and specifically a polyester material) has a tensile strength greater than 23 lbs/in, elongation of 90% and/or a melting temperature greater than 250 degrees C. Applicant has found that forming layer 12 from a material having these properties performs well in a splicing process. In various embodiments, layer 12 has an average thickness of between 0.25 mils to 10 mils, and specifically between 1.0 mil and 5.0 mils.

In specific embodiments, the second polymer material of layer 14 is a cross-linked polymer material, specifically a cross-linked polyurethane, that includes one or more additive 42 that limits or controls the degree of adhesion between layer 12 and layer 14 present at interface 40. Applicant has found that use of the anti-adhesion material (at least in the materials and processes discussed herein) provides a high level of control and consistency of the bond at interface 40 which translates to a high level of control over the separation at interface 40 during splicing. In a specific embodiment, anti-adhesion additive is Additol EX 6568 commercially available from Allnex Belgium SA/NV.

In specific embodiments, layer 14 is formed from a liquid polymer material or lacquer which is coated in liquid form onto surface 22 of layer 12. In various embodiments, the liquid material includes a carrier liquid (e.g., water, solvent, etc.) which supports the polymer component (and any other component of the liquid material). Following application onto layer 12, the liquid polymer material is cured which causes crosslinking between the polymer components and removal of the liquid component resulting in the solid, cross-linked polymer layer 14. In specific embodiments, curing of the applied liquid polymer material is achieved through heating, and in some specific embodiments, the applied liquid material includes a catalyst material (e.g., a metal based catalyst, such as tin or non-tin based catalysts) to further facilitate cross-link. In other embodiments, curing and cross-linking may be achieved through aging at ambient temperatures at longer time intervals, e.g., ambient aging for times up to three weeks.

Applicant has discovered that controlling the curing and/or cross-linking rate, in combination with the anti-adhesion material concentration, allows the bond strength and consistency at interface 40 to be controlled. Applicant has found that if the cure rate is too high (for a given material combination of layers 12 and 14), the bond strength at interface 40 will be too high, which in turn prevents separation along interface 40 during use in a splicing operation.

In particular, Applicant believes that by forming layer 14 (and consequently interface 40) from a liquid application and cure process as discussed herein allow the bond strength at interface 40 to be more controlled and consistent as compared to splice tapes formed using a sheet-to-sheet lamination process. In embodiments utilizing a liquid application and cure to form layer 40, the control and consistency of bond strength at interface 40 is believed to be the result of the cure process rate (as discussed below) and/or the inclusion of the adhesion additive 42 and its incorporation during the cure process. Applicant believes that this high level bond consistency is difficult/impossible to achieve utilizing typical laminated structure. In specific embodiments, tape 10 including liquid applied/cured layer 14 includes residual carrier fluid (e.g., water or a solvent such as buytl acetate) within cured layer 14 which is not present in a tape formed from a lamination process. In specific embodiments, layer 14 includes residual carrier fluid in amounts greater than 0% and less than 1% and more specifically greater than 0.01% and less than 1%.

In various embodiments, curing and/or anti-adhesion material ensures that tape 10 has a bond strength between layers 12 and 14 at interface 40 and is between 0.01 oz. per inch of tape width and 5 oz. per inch of tape width such that when a force is applied that is greater than bond strength, tape 10 separates along interface 40. In a specific embodiment, the cure rate and/or anti-adhesion material ensures that the bond strength between layers 12 and 14 at interface 40 is between 0.1 oz. per inch of tape width and 5 oz. per inch of tape width such that when a force is applied that is greater than bond strength, tape 10 separates along interface 40. In a more specific embodiment, Applicant has found that the cure rate and/or anti-adhesion material ensures that the bond strength between layers 12 and 14 at interface 40 is between 0.1 oz. per inch and 2 oz. per inch of tape width such that when a force is applied that is greater than bond strength, tape 10 separates along interface 40.

In particular embodiments discussed herein, bond strength is measured using the test method defined by PSTC-101 modified, 180 degree peel adhesion at 12 inches/minute peel speed, to measure the bond strength between layer 12 and layer 14. This test procedure measures the force required to separate layer 12 from layer 14. Applicant has determined that in a specific embodiment, the bond strength (e.g., peel force) between layer 12 and layer 14 is found to be between 0.3 oz per inch and 1.12 oz per inch of tape width. In a specific embodiment, Applicant has determined that a cure time of 1 week in combination with use of the anti-adhesion promotor, results in formation of a tape having the bond strength between layer 12 and layer 14 of between 0.3 oz per inch and 1.12 oz per inch of tape width.

Applicant has tested the bond strength at interface 40 at various times during the curing process to determine the length of cure time that results in various desirable bond strengths. Applicant's tests have correlated the cure time with bond strength at interface 40 as follows: 24 hours results in 5.6-6.4 oz/in of bond strength, 48 hours results in 1.28-2.24 oz/in of bond strength, 120 hours results in 0.96-1.12 oz/in of bond strength, 144 hours results in 0.80-0.96 oz/in of bond strength, 168 hours results in 0.48-0.96 oz/in of bond strength, 192 hours results in 0.48-0.96 oz/in of bond strength and 90 days results in 0.48-0.96 oz/in of bond strength. Thus, Applicant has found that cure rate and cure time correlates to the bond strength at interface 40, and if the bond strength is too high due to a cure rate that is too high (e.g., because of heating too quickly, drying too quickly, use of too much crosslinker, use of too little anti-adhesive promotor, etc.), layer 14 will not split properly from layer 12. Further Applicant has found that if cure rate is too high, the cure time based reduction in bond strength is not achieved, and layer 14 essentially will be permanently adhered to layer 12. In specific embodiments, curing occurs at room temperature and in other embodiments curing occurs at an elevated temperature (e.g., a temperature between 150 and 220 degrees F. for between 5 and 10 minutes) which then may be followed by room temperature curing for the times set forth above.

Applicant has discovered that the use of anti-adhesion additive 42 in combination with a liquid-applied, cross-linked polymer layer 14 further allows for control of bonding at interface 40. In specific embodiments, anti-adhesion material 42 is evenly distributed throughout the material of layer 14 when in liquid form for application. As shown in FIG. 3, layer 14 includes anti-adhesion additive 42 adjacent to interface 40 (e.g., within a depth of 50 microns from interface 40) which allows additive 42 to influence or decrease bonding between layers 12 and 14 at interface 40. Without being bound by theory, Applicant believes that some of the anti-adhesion additive 42 migrates toward the surface of layer 14 during the cure process and effects (e.g., decreases) the bond strength to layer 12. Without the anti-adhesion material 42, Applicant has found that layer 14 bonds permanently to layer 12. Similarly, if layer 14 is cured too fast, layer 14 bonds permanently to layer 12. Applicant has found that if layer 14 is cured too fast, the polyurethane structure and bond strength to layer 12 is not affected by the anti-adhesion material 42. Based on this finding, if layer 14 is cured too fast, Applicant hypothesizes that the anti-adhesion material 42 becomes trapped within the material of layer 14 preventing the anti-adhesion material from decreasing the bond strength at interface 40. Thus, Applicant hypothesizes that under proper cure rate as discussed above, the anti-adhesion material 42 is permitted to move toward interface 40 changing the surface tension of layer 14 and effectively reducing the bond strength to levels discussed above, which allow tape 10 to function in the splice application.

In addition, Applicant believes that by utilizing additive 42 dispersed within the liquid applied material, additive 42 is permitted to influence bond strength relatively slowly during and after curing such that additive 42 decreases the amount of bonding at interface 40 over time. This time-based bond differential may be advantageous, providing a stronger bond at interface 40 during tape manufacturing, but then a weaker bond at a later time when tape 10 is used for splicing. In specific embodiments, the liquid material that forms layer 14 includes a relatively low concentration of additive 42, such as between 1% and 10% of additive 42. In a specific embodiment, the liquid material that forms layer 14 includes between 1% and 10% Additol EX 6568. In some embodiments, these percentages are weight percentages and/or volume percentages. As noted above, additive 42 remains in layer 14 following curing, and thus, cured layer 14 of tape 10 includes between 1% and 10% of additive 42.

In addition to the material type, liquid application and degree of cure/crosslinking, layer 14 includes a variety of other properties that Applicant believes contributes to the high degree of bond control discussed herein. In various embodiments, layer 14 is formed from a material that is impermeable to the material of adhesive layer 18. This impermeability limits/prevents the material of adhesive layer 18 from penetrating through layer 14. Applicant believes that without layer 14 acting as an impermeable barrier, the material of adhesive layer 18 may influence the degree of bond strength at interface 40.

In addition, the material of layer 14 is such that the surface 26 of layer 14 is non-tacky/non-adhesive. In such embodiments, this ensures that surface 26 of layer 14 does not adhere to various materials, machinery, etc. of the roll manufacturing process following splitting at interface 40. In various embodiments, to ensure that surface 26 remains non-tacky following separation, the material of layer 14 remains impermeable to the adhesive material of layer 18 at high temperatures that tape 10 may be exposed to during roll manufacturing processes following splicing. In such embodiments, the material of layer 14 remains impermeable to the adhesive material of layer 18 at temperatures greater than 400 degrees F., more specifically at temperatures greater than 550 degrees F. In specific embodiments, the material of layer 14 remains impermeable to the adhesive material of layer 18 at temperatures between 50 degrees F. and 550 degrees F. given exposure times between 0.5 seconds to 300 seconds.

In various embodiments, the thickness of layer 14 also provides the barrier between surface 26 and adhesive material 18. In various embodiments, layer 14 has an average thickness between 0.25 mils and 15 mils, specifically between 1.0 mil and 8 mils. In specific embodiments, these thicknesses are the dry thicknesses of layer 14 following curing and crosslinking.

In specific embodiments, layer 14 is formed from a material that does not degrade at high temperatures or when exposed to various solvents. In specific embodiments, layer 14 does not degrade when exposed to temperatures between 50 degrees F. and 550 degrees F. given exposure times between 0.5 seconds to 300 seconds. Applicant has found that the cross-linked polyurethane material discussed herein is one example of a material that provides resistance to heat and/or solvent based degradation.

Figure 4:
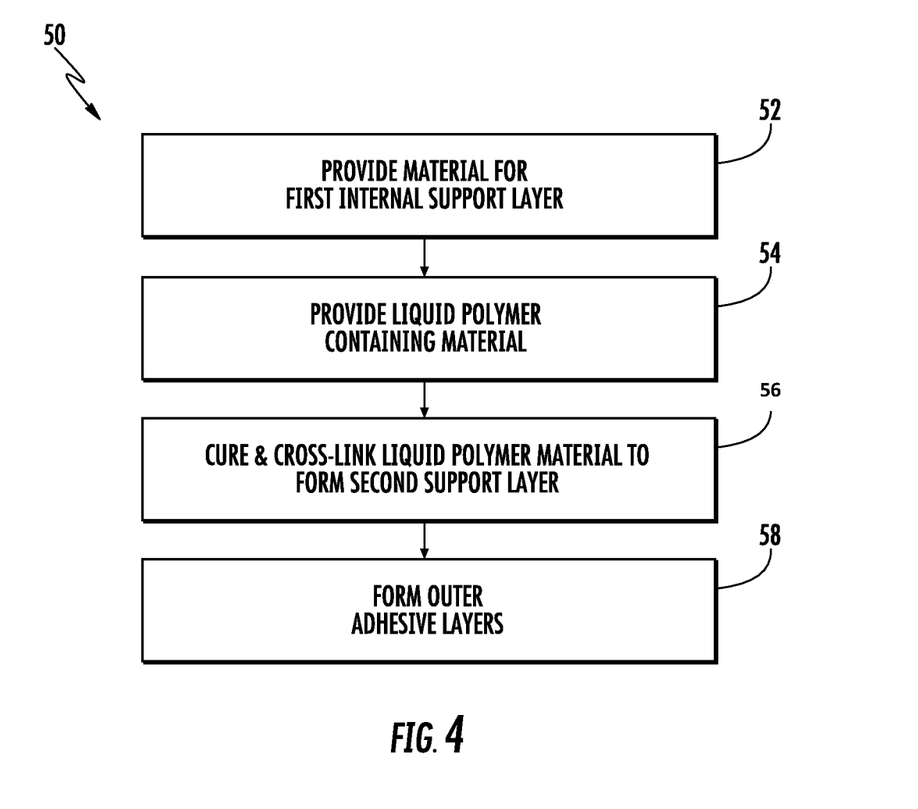
FIG. 4 shows a process for manufacturing the splice tape of FIG. 1, according to an exemplary embodiment.

As noted above, in various embodiments, tape 10 generally, and layer 14 specifically, is formed via a process that provides the precise bonding level at interface 40 as discussed. Referring to FIG. 4, a process 50 for forming a splittable splice tape, such as tape 10, is shown according to an exemplary embodiment. At step 52, a sheet, film or web of support material is provided, and this material is used to form a first internal support layer, such as layer 12, discussed above.

At step 54, a liquid material is applied onto one of the major surfaces (e.g., an inner major surface, such as surface 22 discussed above), and the liquid material includes a polymer material supported in a carrier fluid. In an embodiment, the polymer material is a polyurethane material and the carrier fluid is a solvent, and specifically is buytl acetate. In an alternative embodiment, the polymer material is a polyurethane material and the carrier fluid is water.

At step 56, a second internal support layer, such as layer 14 discussed above, is formed from the liquid polymer containing liquid. In a specific embodiment, the solid second internal support layer is formed by a curing and crosslinking process that causes the polymer material of the applied liquid to form crosslinks with each other and that removes the carrier liquid. The formation of the second internal support layer via curing and cross-linking also creates the separable bond along the interface (e.g., interface 40) between the two internal support layers.

In specific embodiments, the curing and crosslink process is a heating process. Heat is applied to the liquid coated first support layer, and the heat causes crosslinking of the polymer material of the liquid and also causes evaporation of the carrier liquid resulting in the formation of the second internal support layer. In specific embodiments, the heating and curing rate has been determined to relate to the bond strength formed at interface 40. In specific embodiments, the liquid coated first support layer is heated to a temperature between 150 and 220 degrees F. for between 5 and 10 minutes, which Applicant has found forms the desired level of bonding at interface 40. As discussed above, the applied liquid material may include anti-adhesion material 42 to further control the level of bonding that occurs at interface 40. In addition, the liquid material may include a catalyst material that facilitates crosslink formation, as discussed above.

At step 58, adhesive material is applied to the outer major surfaces of both of the support layers such that outer adhesive layers, such as layers 16 and 18, are formed. In specific embodiments, the adhesive material is a liquid (e.g., aqueous) adhesive material, and in such embodiments, the material of layer 12 acts as an impermeable barrier to the material of layer 16, and the material of layer 14 acts as an impermeable barrier to the material of layer 18. As noted above, this impermeability ensures that the bond strength at interface 40 is controlled by preventing alteration of the bond at interface 40 by presence of the adhesive materials of layers 16 and 18. In addition, the impermeability ensures that the adhesive material of layers 16 and 18 does not migrate through layers 12 and 14, respectively, which may otherwise cause the surfaces of layers 16 and 18 at interface 40 (which are exposed during splicing) to be tacky. Lastly, in some embodiments, a release lining material, such as layer 28, is applied to the outer surface of one or both of the exposed outer surfaces of adhesive layers 16 and 18.

Figure 5A:
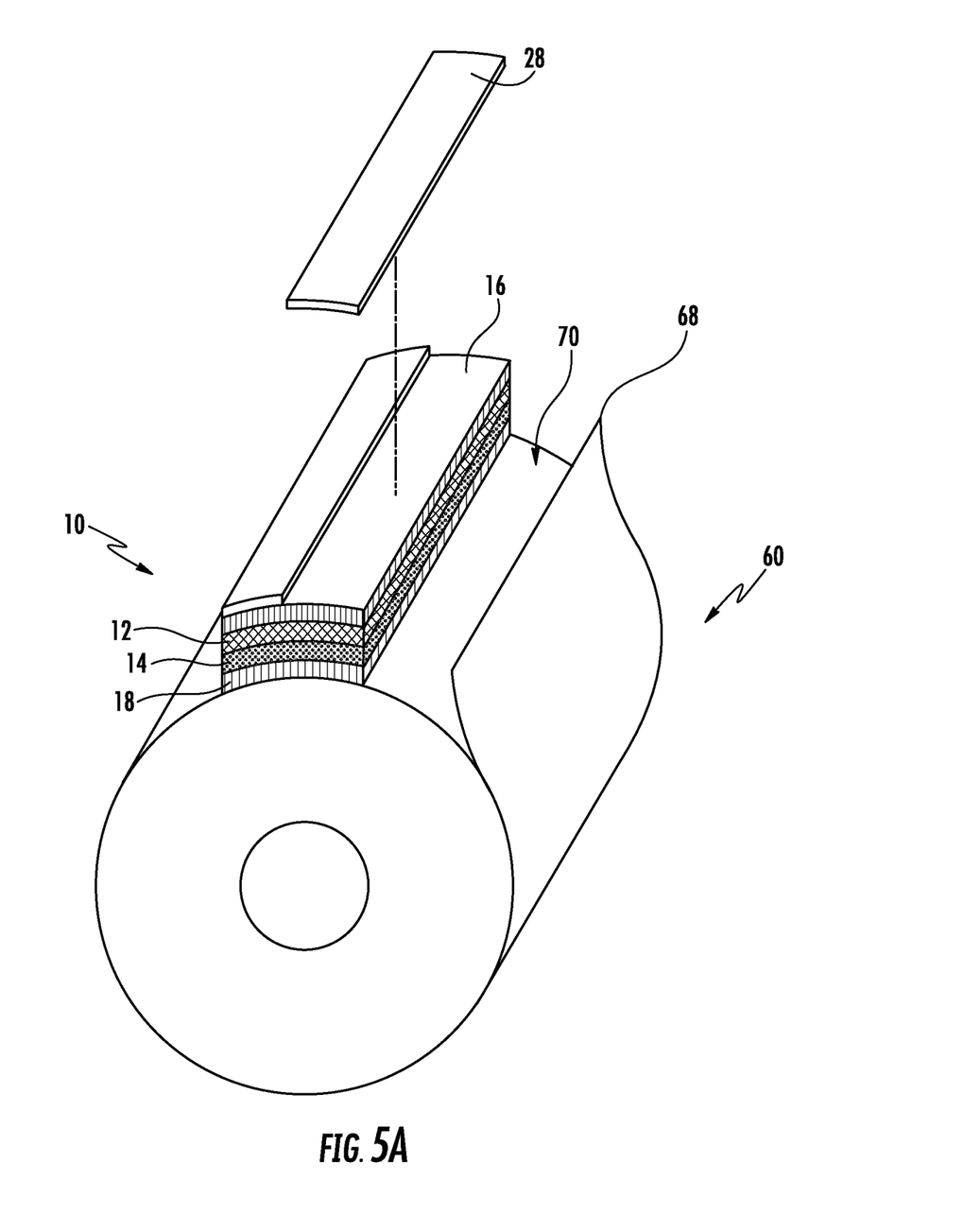
FIGS. 5A-5D show use of the splice tape of FIG. 1 during splicing in a roll manufacturing process, according to an exemplary embodiment.
Figure 5B:
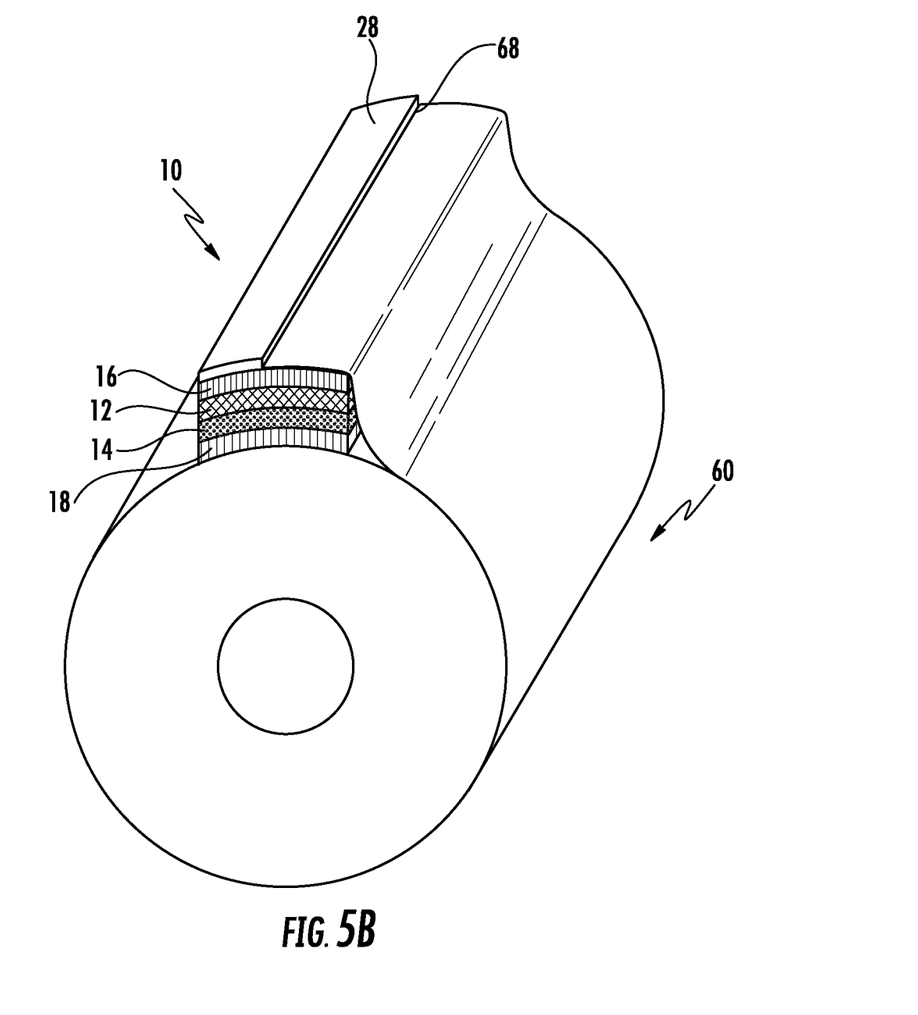
Figure 5C:
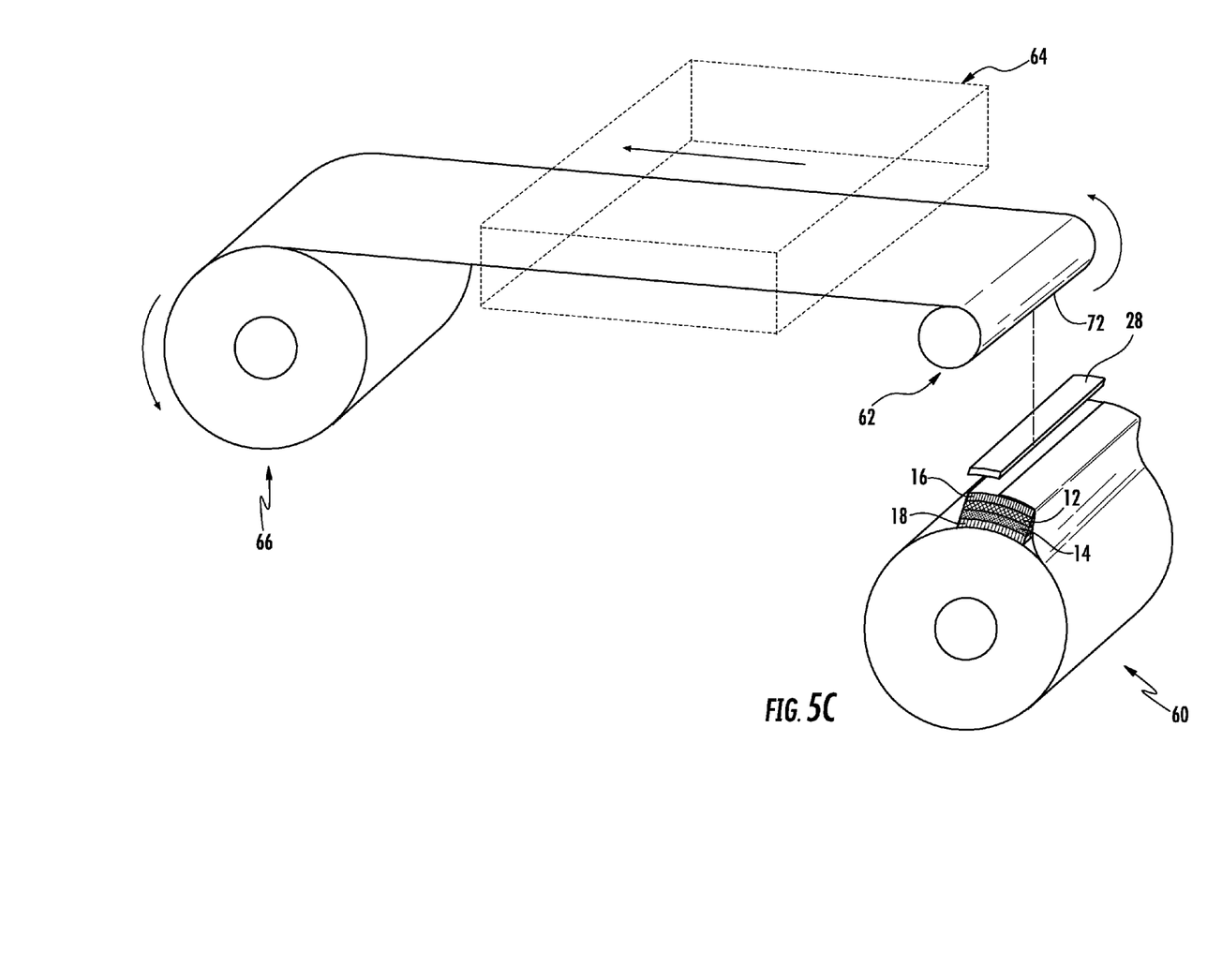

Referring to FIGS. 5A-5D, use of splittable splice tape 10 for splicing together two rolls of material is shown, according to an exemplary embodiment. An incoming or new roll 60 of web/sheet material is provided which will be spliced to a similar roll 62 of web/sheet material (see FIG. 5C) that is currently being paid off and processed through a manufacturing process 64 (e.g., a printing process). As shown in FIG. 5C, the sheet material of rolls 60 and 62 will be spooled on an uptake reel 66 following completion of the manufacturing process 64. In general, process 64 may be any of a wide variety of roll-based manufacturing processes in which splicing in of new rolls of material without interruption is desirable. In various embodiments, process 64 may be a variety of printing or coating processes, and the materials of rolls 60 and 62 may be any of a wide variety of paper, film, foil, web, etc. materials utilized in such processes.

Referring back to FIG. 5A, roll 60 includes a leading edge 68 and an exposed, outer surface 70 which is the outer surface of the second layer of rolled material following leading edge 68. To begin the splicing process using tape 10, the outer surface of adhesive layer 18 is adhered to outer surface 70 such that tape 10 is held in place on roll 60. A portion of release liner 28 is also removed exposing a portion of the outer surface of adhesive layer 16 that is facing the leading edge 68 of roll 60.

As shown in FIG. 5B, the portion of roll 60 adjacent leading edge 68 is pulled over and adhered to the exposed portion of adhesive layer 16. In this arrangement, leading edge 68 is adjacent to the remaining portion of release liner 28. In the arrangement shown in FIG. 5B, roll 60 is ready for splicing onto the existing roll 62. In particular, the portion of roll 60 adjacent leading edge 68 is completely sealed onto adhesive layer 16 such that air is not permitted to move between leading edge 68 and adhesive 16. This tight sealing improves splice integrity by preventing air from moving between the material of roll 60 and adhesive 16 as roll 60 is unspooled into process 64. Because some processes move at high rates of speed (e.g., up to 3000 feet per minute or more for some processes) air, if permitted to flow between the material of roll 60 and adhesive 16, may separate the material of roll 60 from adhesive 16, which will cause the splice to fail.

Figure 5D:
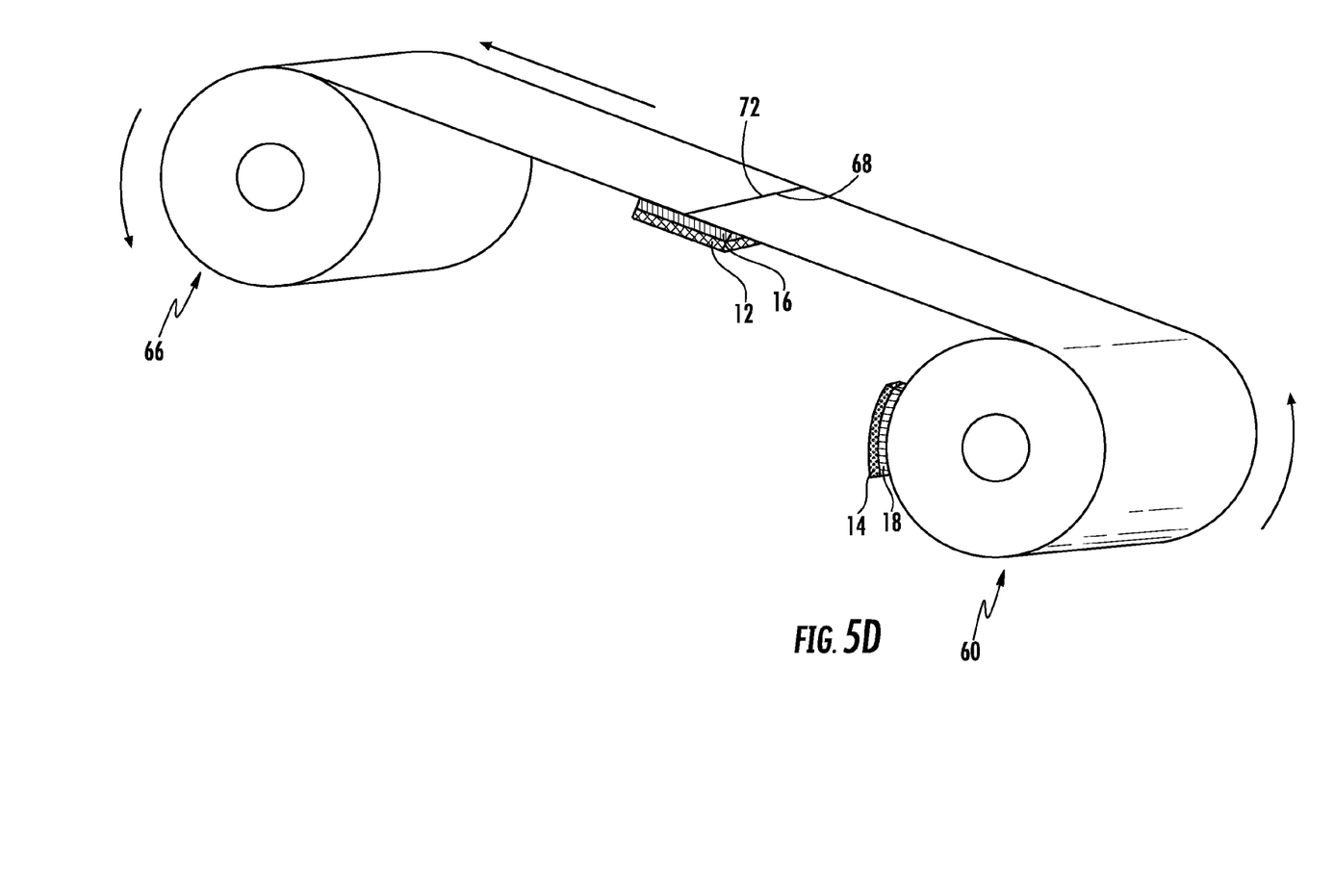

Splicing of existing roll 62 to new, incoming roll 60 is shown in FIGS. 5C and 5D. As shown in FIG. 5C, the remaining portion of release liner 28 is removed exposing the remaining portion of adhesive layer 16. A trailing edge 72 of roll 62 is adhered to the exposed remaining portion of adhesive layer 16.

As shown in FIG. 5D, this positioning results in trailing edge 72 of roll 62 closely abutting leading edge 68 of incoming roll 60 with the splice tape 10 adhered across this abutment maintaining the relative positioning between trailing edge 72 and leading edge 68. Thus, when the material of roll 62 runs out (i.e., is no longer being unspooled) the movement of the material of roll 62 pulls on the material of roll 60 via the splice created by splice tape 10. As shown in FIG. 5D, this causes tape 10 to split along interface 40 and causes leading edge 68 and material of roll 60 to be advanced through process 64 without requiring the process to be stopped.

Thus, as can be seen, the bond formed between layers 12 and 14 at interface must reliably separate as the material of roll 60 gets pulled into process 64 in order to keep the processing moving without interruption. Similarly, all layers 12, 14, 16 and 18 of tape 10 eventually pass through process 64. Thus, the materials of these layers must be able to traverse the manufacturing process 64 without degradation, without sticking to machinery, without causing discoloration to the material of being processed, etc. As discussed above, in various embodiments, tape 10 is uniquely manufactured and structured to provide both controlled bond strength and separation utilizing materials that do not cause problems in process 64.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein the article "a" is intended to include one or more component or element, and is not intended to be construed as meaning only one.

Various embodiments of the invention relate to any combination of any of the features, and any such combination of features may be claimed in this or future applications. Any of the features, elements, or components of any of the exemplary embodiments discussed above may be utilized alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description. In addition, in various embodiments, the present disclosure extends to a variety of ranges (e.g., plus or minus 30%, 20%, or 10%) around any of the absolute or relative dimensions disclosed herein or determinable from the Figures.

What is claimed is:

1. A method of forming a splittable splice tape comprising:
   providing a first internal support layer including a first major surface and a second major surface;
   applying a liquid material onto the second major surface of the first internal support layer, the liquid material including a polymer material supported by a carrier liquid;
   forming a second internal support layer from the liquid material via removal of the carrier liquid and cross-linking of the polymer material, wherein the second internal support layer includes an inner surface bonded to the second major surface of the first internal support layer;
   controlling a bond strength between the first internal support layer and the second internal support layer by controlling a rate of the cross-linking of the polymer material;
   applying a first layer of adhesive material to the first major surface of the first internal support layer; and
   applying a second layer of adhesive material to an outer major surface of the second internal support layer.

2. The method of claim 1, wherein the liquid material includes an anti-adhesion material dispersed within the liquid material, wherein the anti-adhesion material decreases bonding between the first internal support layer and the second internal support layer such that the bond strength between the first internal support layer and the second internal support layer is less than a bond strength between the first internal support layer and the first layer of adhesive material such that upon application of a force away from the interface the splice tape separates in two portions along the interface.

3. The method of claim 1, wherein the first internal support layer is formed from a sheet of thermoplastic material, and the polymer material of the liquid material is different from the thermoplastic material.

4. The method of claim 3, wherein the polymer material of the liquid material is a polyurethane material, and formation of the second internal support layer includes heating the liquid material to a temperature of 150 to 220 degrees F. for between 5 and 10 minutes such that the carrier liquid evaporates and crosslinks between polyurethane molecules of the polymer material are formed.

5. The method of claim 3, wherein the thermoplastic material of the first internal support layer is impermeable to the first adhesive material.

6. The method of claim 3, wherein the thermoplastic material of the first internal support layer has a melt temperature greater than 230 degrees F. and the polymer material of the second internal support material is impermeable to the second layer of adhesive material at temperatures greater than 400 degrees F.

7. The method of claim 1, wherein the rate of cross-linking of the polymer material is controlled such that the bond strength is between 0.3 oz/inch of tape width and 1.12 oz/inch of tape width.

8. The method of claim 1, wherein the first internal support layer is formed from a sheet of thermoplastic material, and the polymer material of the liquid material is different from the thermoplastic material, wherein the liquid material includes an anti-adhesion material dispersed within the liquid material, wherein the anti-adhesion material decreases bonding between the first internal support layer and the second internal support layer such that the bond strength at an interface between the first internal support layer and the second internal support layer is less than a bond strength between first internal support layer and the first layer of adhesive material such that upon application of a force away from the interface the splice tape separates in two portions along the interface.

* * * * *